(12) United States Patent
Lee

(10) Patent No.: US 12,427,985 B2
(45) Date of Patent: Sep. 30, 2025

(54) VEHICLE CONTROL SYSTEM AND METHOD

(71) Applicant: HYUNDAI MOBIS CO., LTD., Seoul (KR)

(72) Inventor: Jeong Hee Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 304 days.

(21) Appl. No.: 17/722,656

(22) Filed: Apr. 18, 2022

(65) Prior Publication Data

US 2022/0332320 A1 Oct. 20, 2022

(30) Foreign Application Priority Data

Apr. 20, 2021 (KR) .......... 10-2021-0050995
Apr. 20, 2021 (KR) .......... 10-2021-0050996

(51) Int. Cl.
| | |
|---|---|
| B60W 30/165 | (2020.01) |
| B60W 30/14 | (2006.01) |
| B60W 40/072 | (2012.01) |
| G05D 1/00 | (2024.01) |
| G06V 20/58 | (2022.01) |
| G08G 1/00 | (2006.01) |
| H04W 4/46 | (2018.01) |

(52) U.S. Cl.
CPC ........ *B60W 30/165* (2013.01); *B60W 30/143* (2013.01); *B60W 40/072* (2013.01); *G05D 1/0293* (2013.01); *G05D 1/0295* (2013.01); *G06V 20/58* (2022.01); *G08G 1/22* (2013.01); *H04W 4/46* (2018.02); *B60W 2420/403* (2013.01); *B60W 2552/30* (2020.02); *B60W 2554/802* (2020.02); *B60W 2554/804* (2020.02); *B60W 2555/60* (2020.02); *B60W 2556/65* (2020.02)

(58) Field of Classification Search
None
See application file for complete search history.

(56) References Cited

U.S. PATENT DOCUMENTS

| | | | |
|---|---|---|---|
| 9,934,688 B2 * | 4/2018 | Olson | B60W 30/08 |
| 10,169,669 B2 * | 1/2019 | Yoshitomi | G08G 1/09623 |
| 2016/0159350 A1 * | 6/2016 | Pilutti | B60W 30/143 701/23 |
| 2017/0166207 A1 * | 6/2017 | Darms | B60W 30/165 |
| 2017/0313311 A1 * | 11/2017 | Niino | B60W 40/04 |
| 2017/0326980 A1 * | 11/2017 | Masui | B60W 30/00 |
| 2017/0327116 A1 * | 11/2017 | Heo | B60W 30/18018 |

(Continued)

FOREIGN PATENT DOCUMENTS

KR 10-2009-0107807 A 10/2009

*Primary Examiner* — Fadey S. Jabr
*Assistant Examiner* — Mario C Gonzalez
(74) *Attorney, Agent, or Firm* — NSIP Law

(57) ABSTRACT

A vehicle control system includes a receiving unit to receive movement information of a plurality of forward vehicles on a road on which a subject vehicle is driven through V2X communication; a sensor to sense a specific forward vehicle, from among the plurality of forward vehicles, that is driven ahead of the subject vehicle; and a control unit to calculate a driving path for the subject vehicle based on the movement information of the plurality of forward vehicles received by the receiving unit and to control driving of the subject vehicle to follow the driving path or the specific forward vehicle.

16 Claims, 5 Drawing Sheets

(56) References Cited

U.S. PATENT DOCUMENTS

| | | | |
|---|---|---|---|
| 2018/0174459 A1* | 6/2018 | Oh | B60W 30/10 |
| 2021/0163004 A1* | 6/2021 | Wiberg | B60W 30/12 |
| 2022/0089157 A1* | 3/2022 | Ito | G08G 1/22 |
| 2022/0176957 A1* | 6/2022 | Tamilarasan | B60W 40/06 |
| 2022/0185281 A1* | 6/2022 | Noguchi | B60W 40/02 |

* cited by examiner

VEHICLE CONTROL SYSTEM AND METHOD

CROSS-REFERENCE TO RELATED APPLICATION

The present application claims priority to Korean Patent Application Nos. 10-2021-0050995, filed Apr. 20, 2021, and 10-2021-0050996 filed on Apr. 20, 2021, the entire contents of which is incorporated herein for all purposes by this reference.

BACKGROUND OF THE INVENTION

Field of the Invention

The present invention relates to a vehicle control system and method and, more particularly, to a technology of receiving information of forward vehicles through V2X communication or V2V communication and controlling a subject vehicle on the basis of the information.

Description of the Related Art

A vehicle of which the driving stability and convenience for a driver is improved by combining various in information and communication (IT) technologies such as electronic, communication, control, and AI technologies is called an intelligent car or a smart car.

Such a smart car is composed of mainly a telematic technology that is a combination of wireless communication functions, such as an advanced traffic management system, an electronic toll collection system, an intelligent traffic system, etc., an infotainment technology that provides both driving-related information and an entertainment function, a driverless driving system that is targeted at an automotive navigation system, etc., and the objective of thereof is to provide an optimal traffic efficiency, secure safety, and provide convenience and enjoyment to users.

In these various technologies, researches and investments have been continuously made to improve safety in the automotive industry due to the number of car accidents that increase year by year and the loss of life and property.

In particular, recently, not only various sensors for detecting surrounding situations, but also an information sharing method with other vehicles through wireless communication have been proposed and attempted to use for driving. However, according to the methods that are used at present, surrounding situations only at the moment of sensing can be recognized and past information is slightly difficult to infer.

The description provided above as a related art of the present invention is just for helping understanding the background of the present invention and should not be construed as being included in the related art known by those skilled in the art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention has been made in an effort to solve the problems described above and an objective of the present invention is to receive driving information of external vehicles through V2X communication and control driving of a subject vehicle on the basis of the driving information.

A vehicle control system according to the present invention includes: a receiving unit configured to receive movement information of a plurality of forward vehicles on a road on which a subject vehicle is driven through V2X communication; a sensor configured to sense a specific forward vehicle, from among the plurality of forward vehicles, that is driven ahead of the subject vehicle; and a control unit configured to calculate a driving path for the subject vehicle based on the movement information of the plurality of forward vehicles received by the receiving unit and to control driving of the subject vehicle to follow the driving path or the specific forward vehicle.

The receiving unit may be configured to receive forward driving paths from the plurality of forward vehicles and the control unit may be configured to calculate the driving path for the subject vehicle from the forward driving paths.

The control unit may be configured to derive an average driving path by averaging the forward driving paths received by the receiving unit and to control the subject vehicle to be driven along the average driving path.

The control unit may be configured to calculate a forward driving path within a preset curvature as the driving path for the subject vehicle from the forward driving paths received by the receiving unit.

The control unit may be configured to calculate a forward driving path based on the movement information of one or more of the forward vehicles, shift the forward driving path to a center of a lane of the subject vehicle, and calculate the shifted forward driving path as the driving path for the subject vehicle.

The sensor may be configured to sense one of the forward vehicles in a driving lane and the control unit may be configured to control the subject vehicle to follow the one forward vehicle when similarity of a forward driving path of the one forward vehicle and the driving path for the subject vehicle meets a certain threshold.

The sensor may be configured to sense one of the forward vehicles in a driving lane and the control unit may be configured to control the subject vehicle to follow the driving path for the subject vehicle when similarity of a forward driving path of the one forward vehicle and the driving path for the subject vehicle fails to meet a certain threshold.

The receiving unit may be configured to receive driving information of an adjacent external vehicle on the road on which the subject vehicle is driven through V2X communication, and the control unit may be configured to control a speed of the subject vehicle based on the driving information of the external vehicle when the speed of the subject vehicle is equal to or higher than a speed of the external vehicle.

When it is determined that there is not an external vehicle ahead of the subject vehicle in a driving lane of the subject vehicle based on the driving information of external vehicles received by the receiving unit, the control unit may be configured to control the speed of the subject vehicle based on driving information of an external vehicle that is being driven in a side lane.

The receiving unit may be configured to receive driving information of an external vehicle that is driven in a first side lane, of which a speed limit is higher than a speed limit of the driving lane, and the control unit may be configured to control the speed of the subject vehicle based on the driving information of the external vehicle that is driven in the first side lane.

When the speed of the subject vehicle is equal to or lower than an average speed of the external vehicle that is being driven in the first side lane, the control unit control unit may be configured to control the speed of the subject vehicle based on driving information of an external vehicle that is being driven in a second side lane of which a speed limit is lower than the speed limit of the driving lane.

A vehicle control method according to the present invention includes: receiving movement information of a plurality of forward vehicles on a road on which a subject vehicle is driven through V2X communication; sensing a specific forward vehicle, from among the plurality of forward vehicles, that is driven ahead of the subject vehicle; and calculating a driving path for the subject vehicle based on the movement information of the plurality of forward vehicles, and controlling driving of the subject vehicle to follow the driving path or the specific forward vehicle.

The vehicle control method may further include receiving forward driving paths from the plurality of forward vehicles and calculating the driving path for the subject vehicle from the forward driving paths.

The vehicle control method may further include deriving an average driving path by averaging the forward driving paths; and controlling the subject vehicle to be driven along the average driving path.

The controlling may further include calculating a forward driving path based on previously obtained movement information of one or more of the forward vehicles and shifting the forward driving path to a center of a lane of the subject vehicle; and calculating the shifted forward driving path as the driving path for the subject vehicle.

The vehicle control method may further include sensing one of the forward vehicles in a driving lane and comparing a forward driving path of the one forward vehicle with the driving path for the subject vehicle; and controlling the subject vehicle to follow the one forward vehicle when similarity of the forward driving path of the one forward vehicle and the driving path for the subject vehicle meets a certain threshold.

The vehicle control method may further include receiving driving information of an adjacent external vehicle on the road on which the subject vehicle is driven through V2X communication; and controlling a speed of the subject vehicle based on the driving information of the external vehicle when the speed of the subject vehicle is equal to or higher than a speed of the external vehicle.

The vehicle control method may further include determining whether there is an external vehicle ahead of the subject vehicle in a driving lane of the subject vehicle based on driving information of external vehicles; and controlling the speed of the subject vehicle based on driving information of an external vehicle that is being driven in a side lane.

The vehicle control method may further include: calculating an average of speeds of external vehicles that are driven in a first side lane, of which a speed limit is higher than a speed limit of a driving lane, as a first average value based on driving information of external vehicles that are driven in the first side lane; comparing the first average value with the speed of the subject vehicle; and controlling the subject vehicle to be driven at the first average value when the speed of the subject vehicle is higher than the first average value.

The vehicle control method may further include calculating an average of speeds of external vehicles that are driven in a second side lane, of which a speed limit is lower than the speed limit of the driving lane, as a second average value based on the driving information of external vehicles that are driven in the second side lane; comparing the second average value with the speed of the subject vehicle when the speed of the subject vehicle is lower than the first average value; and controlling the subject vehicle to be driven at the second average value when the speed of the subject vehicle is higher than the second average value.

The vehicle control system according to the present invention receives forward driving paths from a plurality of forward vehicles adjacent to a subject vehicle through V2X communication, calculates an average driving path on the basis of the forward driving paths, and controls the subject vehicle on the basis of the calculated average driving path, whereby there is an effect that the subject vehicle can be smoothly driven in a rapid curve section when it autonomously drives.

Further, when the similarity of the calculated average driving path and the forward driving path of a forward vehicle that is driven ahead of the subjective vehicle in the driving lane is high as the result of comparing the driving paths, the control unit controls the subject vehicle to follow the forward vehicle, whereby there is an effect that it is possible to improve stability when the subject vehicle autonomously drives.

Further, when there is no external vehicle ahead of the subjective vehicle that is autonomously driving, the speed of the subject vehicle is controlled close to the speed of an external vehicle that is being driven in a side lane, so the subject vehicle is driven at a safe speed through platooning, whereby there is an effect that the probability of an accident can be reduced.

Further, there is an effect that it is possible to control the subject vehicle not to interfere with traffic flow by controlling the speed of the subject vehicle at an appropriate speed in accordance with the speed limits of lanes.

Other features and aspects will be apparent from the following detailed description, the drawings, and the claims.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Figure 1:
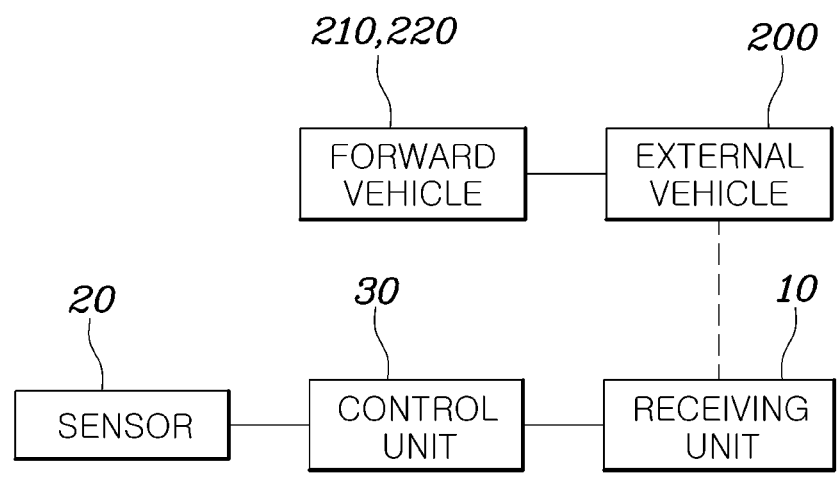
FIG. 1 is a configuration diagram of a vehicle control system according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various components, these components should not be limited by these terms. These terms are only used to distinguish one element, from another element. For instance, a first element discussed below could be termed a second element without departing from the right range of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present invention Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

The present invention will be described hereafter in detail by describing exemplary embodiments of the present invention with reference to the accompanying drawings. Like reference numerals given in the drawings indicate like components.

A receiving unit 10, a sensing unit 20, and control unit 30 according to exemplary embodiments of the present invention can be implemented through a nonvolatile memory (not shown) configured to store data about algorithms for controlling operation of various components of a vehicle or about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

Figure 2:
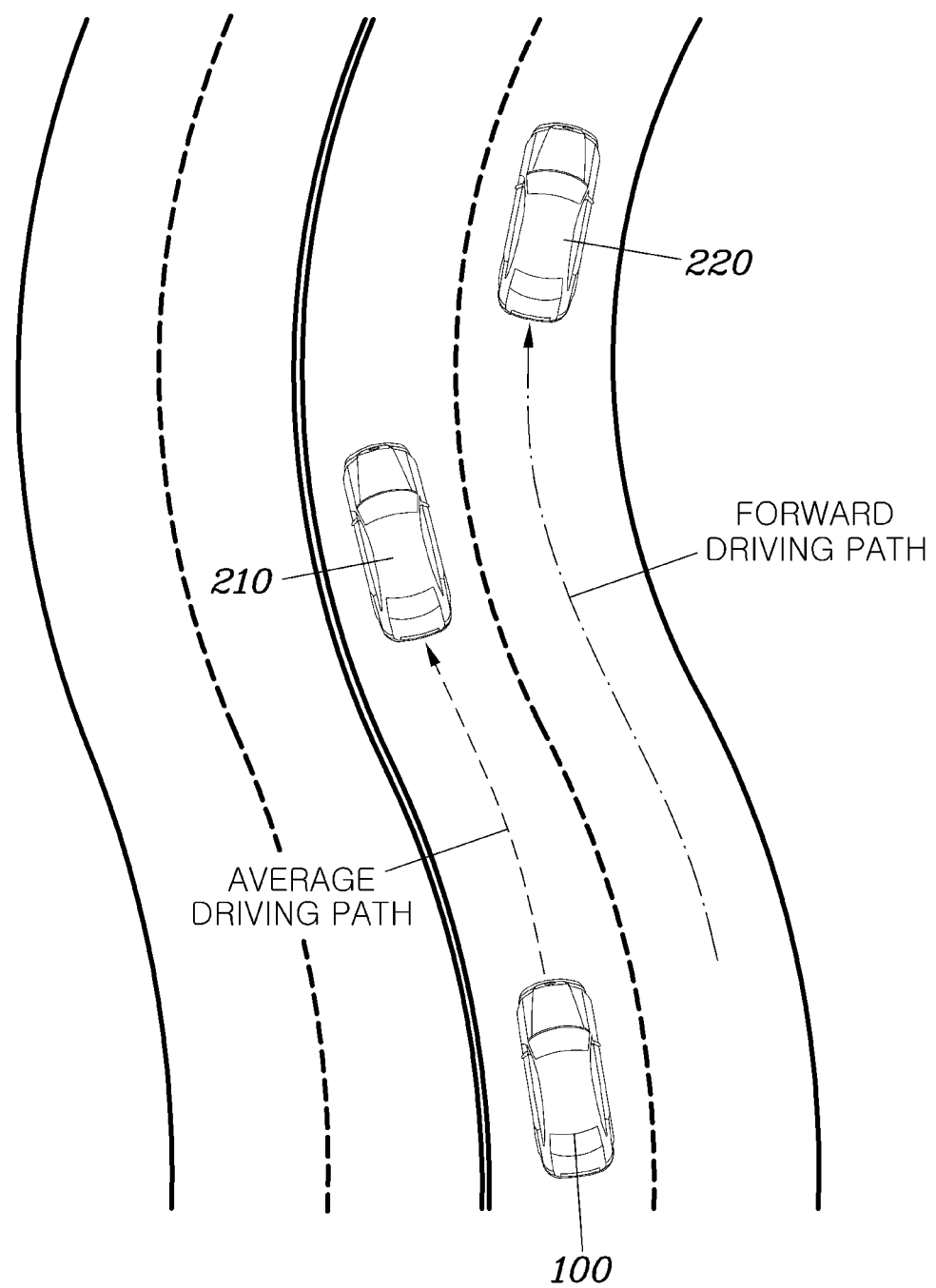
FIG. 2 is a diagram showing a situation in which a subject vehicle is driven on a curve road.

FIG. 1 is a configuration diagram of a vehicle control system according to an embodiment of the present invention and FIG. 2 is a diagram showing a situation in which a subject vehicle 100 is driven on a curve road.

An exemplary embodiment of a vehicle control system according to the present invention is described with reference to FIGS. 1 and 3.

The vehicle control system according to the present invention is applied to an automotive vehicle 100 and was designed to enable a vehicle 100 to perform platooning or following at a safe speed when the subject vehicle 100 is driven on a road.

The vehicle control system according to the present invention includes: a receiving unit 10 that receives movement information of a plurality of forward vehicles 220 on a road on which a subject vehicle 100 is driven through V2X communication; a sensor 20 that senses a forward vehicle 220 that is driven ahead of the subject vehicle 100; and a control unit 30 that calculates a driving path for the subject vehicle 100 on the basis of the movement information of the plurality of forward vehicles 220 received by the receiving unit 10 and controls driving of the subject vehicle 100 to follow the calculated driving path or the forward vehicle 220 sensed by the sensor 20.

The receiving unit 10 is connected with a wireless communication device provided in the subject vehicle 100 and may discriminate forward vehicles 210 and 220 from external vehicles 200 driven adjacent to the subject vehicle 100 and receive driving information of the forward vehicles 210 and 220 through V2X communication or V2V communication.

V2X communication may receive driving information of forward vehicles 210 and 220 through the subject vehicle 100 and a road traffic system constructed outside and V2V communication may directly receive or transmit driving information between the subject vehicle 100 and forward vehicles 210 and 220.

V2X communication may receive the driving information of the subject vehicle 100 having a wide communication range and the communication range of V2V may be limited, depending on the performance of wireless communication devices.

The driving information of forward vehicles 210 and 220 received by the receiving unit 10 may be a location history of movement of the subject vehicle 100 or a steering history of the subject vehicle 100.

The sensor 20 is provided in the subject vehicle 100 and may sense location information of movement information of an external vehicle 100 driven adjacent to the vehicle. The sensor 20 may include a camera sensor, a radar sensor, an ultrasonic sensor, or the like.

The control unit 30 may control steering of the subject vehicle 100 on the basis of the driving paths of forward vehicles 210 and 220 received by the receiving unit 10 or may set the driving path of an external vehicle 100 received by the receiving unit 10 as a driving path for the subject vehicle 100 and may compare the driving path with the driving path of the forward vehicle 220 that is driven in the driving lane so that the subject vehicle 100 follows the forward vehicle 210.

Accordingly, when the subject vehicle 100 that is controlled to be autonomously driven suddenly enters a curved road while being driven on a straight road, the control unit 30 may control the steering angle of the subject vehicle 100 so that the subject vehicle 100 is smoothly driven on the curved road.

The receiving unit 10 may receive forward driving paths from a plurality of forward vehicles 220 and the control unit

30 may calculate a driving path for the subject vehicle 100 from the forward driving paths.

The receiving unit 10 may receive a plurality of driving path by receiving forward driving paths from a plurality of forward vehicles 220.

The forward driving paths of the forward vehicles 220 may be different, but the lane gaps and driving paths are similar, so the receiving unit 10 may receive a plurality of forward driving paths, set a driving path for the subject vehicle 100 on the basis of the forward driving paths, and apply the set driving path to autonomous driving of the subject vehicle 100.

Accordingly, a driving path can be accurately set for the subject vehicle 100 and the control unit 30 can control autonomous driving of the subject vehicle 100 so that the subject vehicle 100 is smoothly driven on a suddenly curved road.

The control unit 30 may derive an average driving path by averaging a plurality of forward driving paths received by the receiving unit 10 and may control the subject vehicle 100 to be driven along the average driving path considered as a driving path for the subject vehicle 100.

The control unit 30 may calculate an average driving path that is an average value according to locations of a plurality of forward driving paths received by the receiving unit 10, and may set steering of the subject vehicle 100 and control driving of the subject vehicle 100 on the basis of the average driving path.

Accordingly, there is an effect that it is possible to improve accuracy of a driving path for the subject vehicle 100 by calculating an average driving path of a plurality of forward driving paths.

The controller 30 may calculate a forward driving path that is within a preset curvature, among the forward driving paths received by the receiving unit 10, as a driving path for the vehicle 10.

The forward driving vehicle of an external vehicle 100, which has changed lanes once or more on a curved road without traveling one same lane, of the forward vehicles 220 may be set as a forward driving path over the preset curvature. When the forward driving path over the preset curvature is received, an average driving path may be calculated from the other forward driving paths except for the forward driving path over the preset curvature that is used for calculating an average driving path.

Accordingly, there is an effect that it is possible to calculate an accurate average driving path and stably drive the subject vehicle 100 on a curved road by controlling the driving path of the subject vehicle 100 on the basis of the average driving path.

The control unit may calculate a forward driving path on the basis of movement information of a forward vehicle 220, shift the forward driving path to the center of the lane of the subject vehicle 100, and calculate the shifted forward driving path as a driving path for the subject vehicle 100.

As shown in FIG. 2, the control unit 30 may shift the forward driving path of a forward vehicle 220 or an average driving path of a plurality of forward driving paths to the center of the subject vehicle 100 and recognizes the driving path as a virtual line and may control the subject vehicle 100 to be driven along the shifted average driving path.

Further, the sensor 20 provided in the subject vehicle 100 may sense both side lines of the driving lane of the subject vehicle 100 and the control unit 30 may control steering of the subject vehicle 100 so that the subject vehicle 100 is driven at the center of the lane by shifting an average driving path to the center of the lane.

Accordingly, there is an effect that the subject vehicle 100 can be safely driven along a calculated average driving path at the center of a lane without crossing other lanes.

The sensor 20 may sense a forward vehicle 200 in the driving lane, and when similarity of the forward driving path of the forward vehicle 200 and a calculated driving path is high, the control unit 30 may control the subject vehicle 100 to follow the forward vehicle 220.

The receiving unit 10 may receive the forward driving path of the forward vehicle 220 that is being driven in the driving lane sensed by the sensor 20, and the control unit 30 may compare a calculated average driving path with the forward driving path, and may control the subject vehicle 100 to be driven to follow the forward vehicle 220 that is being driven in the lane sensed by the sensor 20 in accordance with the driving information of the forward vehicle 220 when the similarity of the average driving path and the forward driving path is a preset value or more.

Accordingly, there is an effect that the subject vehicle 100 is driven along the average driving path and also follows the forward vehicle 220 that is being driven in the lane, thereby being able to be stably driven.

Further, the sensor 20 may sense a forward vehicle 200 in the driving lane, and when the similarity of the forward driving path of the forward vehicle 220 and a calculated driving path is low, the control unit 30 may control the subject vehicle 100 to be driven along the calculated driving path.

When there is no forward vehicle 220 or the similarity of the forward driving path of the forward vehicle 200 that is being driven in the driving lane and an average driving path is lower than a preset value, the control unit may control the subject vehicle 100 to be driven along the calculated average driving path.

Accordingly, there is an effect that the subject vehicle 100 is controlled to be driven along an average driving path on a curved road when there is no forward vehicle in the driving lane or it is difficult to follow a forward vehicle 220 that is being driven in the driving lane because the forward vehicle 220 frequently changes lanes, whereby the subject vehicle 100 can be stably driven.

Figure 3:
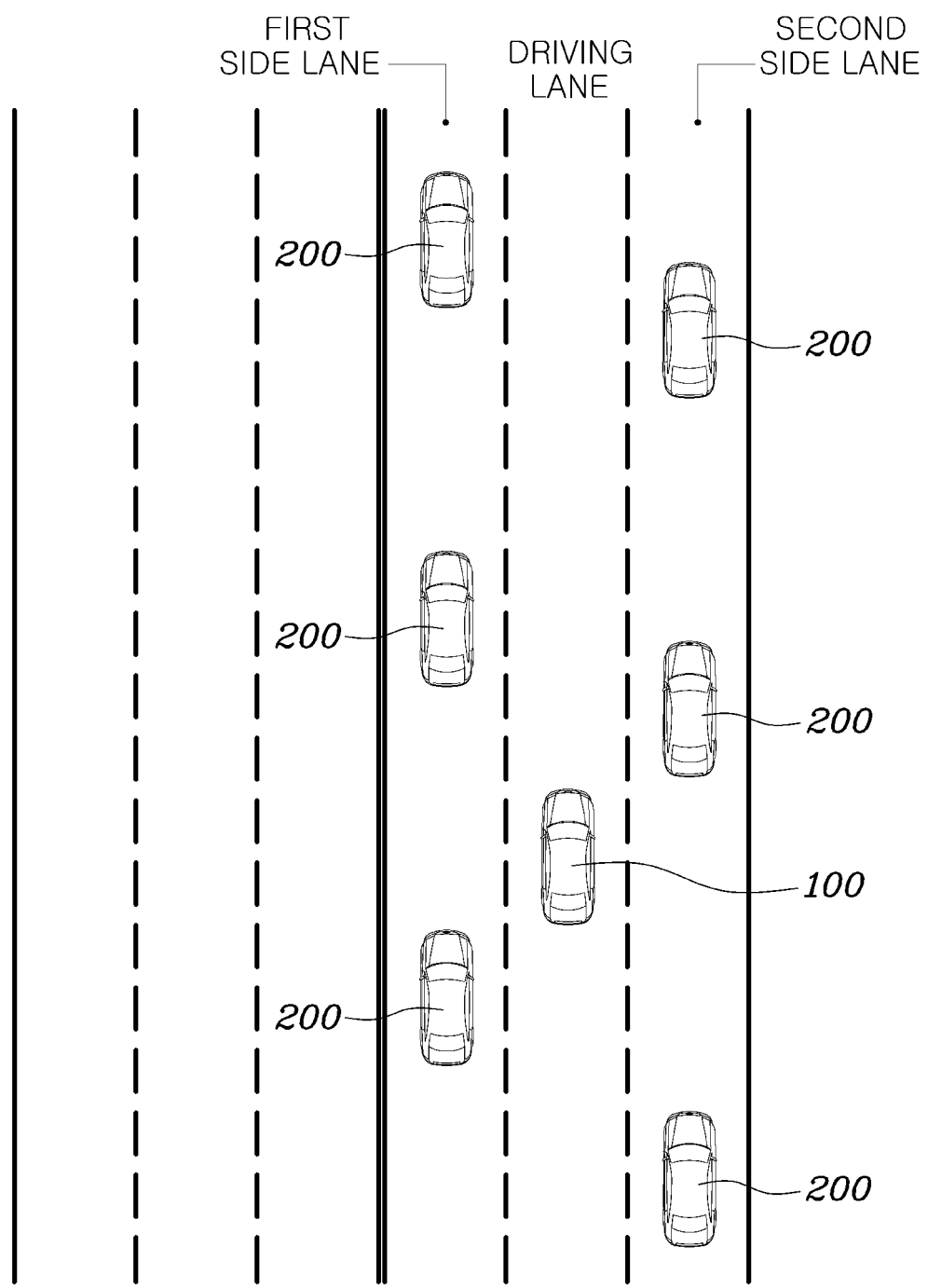
FIG. 3 is a diagram showing the case when there is no vehicle ahead of a subject vehicle on the lane of the subject vehicle.

FIG. 3 is a diagram when there is no external vehicle 200 ahead of the subject vehicle 100 in the driving lane.

An exemplary embodiment of a vehicle control system according to the present invention is described with reference to FIGS. 1 and 3.

The vehicle control system according to the present invention is applied to an automotive vehicle 100 and was designed to enable the vehicle 100 to perform platooning or following at a safe speed when the subject vehicle 100 is driven on a road.

The receiving unit 10 of the vehicle control system according to the present invention may receive driving information of an external vehicle 200 adjacent to the subject vehicle 100 on a road through V2X communication and the control unit 30 may control the speed of the subject vehicle 100 on the basis of the driving information of the external vehicle 200 when the speed of the subject vehicle 100 is equal to or higher than the speed of the external vehicle 200 received by the receiving unit 10.

The receiving unit 10 may be connected with a wireless communication device provided in the subject vehicle 100 and may receive the driving information an external vehicle 200 that is being driven adjacent to the subject vehicle 100 through V2V communication.

V2X communication can receive driving information of external vehicles 200 through the subject vehicle 100 and a road traffic system constructed outside and V2V communication can directly receive or transmit driving information between the subject vehicle 100 and external vehicles 200.

V2X communication may receive the driving information of a vehicle 100 having a wide communication range and the communication range of V2V may be limited, depending on the performance of wireless communication devices.

The control unit 30 may control the speed of the subject vehicle 100 on the basis of the information of the external vehicle 200 received by the receiving unit 10. Further, when a speed for following an external vehicle 200 is set in the subject vehicle 100 higher than the speed of an adjacent vehicle 100 or following is impossible because there is no external vehicle 200, the control unit 30 may control the speed of the subject vehicle 100 on the basis of driving information of external vehicles 200 adjacent to the subject vehicle 100 so that the subject vehicle 100 can platoon with the adjacent external vehicles 200.

Accordingly, it is possible to prevent speeding of the subject vehicle 100. Further, there is an effect that the subject vehicle 100 can be safely driven on a road through platooning with adjacent external vehicles 200, and accordingly, there is an effect that it is possible to reduce the probability of an accident.

When it is determined that there is no external vehicle 200 ahead of the subject vehicle 100 in the driving lane on the basis of driving information of external vehicles 200 received by the receiving unit 10, the control unit 30 may control the speed of the subject vehicle 100 on the basis of driving information of an external vehicle 200 that is being driven in a side lane.

When it is determined that there is no external vehicle 200 on the road on which the subject vehicle 100 is driven on the basis of driving information of an external vehicle 200 received by the receiving unit 10, as shown in FIG. 3, it is difficult to operate a Smart Cruising Control (SCC) system for following an external vehicle 200.

In this case, the control unit 30 may control the speed of the subject vehicle 100 on the basis of the driving information of an adjacent external vehicle 200 received by the receiving unit 10.

The vehicle control system further includes a sensor 20 that senses an external vehicle 200 that is driven ahead of the subject vehicle 100. The control unit 30 may determine whether there is an external vehicle 200 ahead of the subject vehicle 100 in the driving lane on the basis of the sensing information obtained by the sensor 20.

The sensor 20 may be connected with a sensor provided in the subject vehicle 100 and may sense movement information of an external vehicle 200 that is driven ahead of the vehicle in the driving lane. When an external vehicle 200 is not sensed in the sensing range set in the sensor, the control unit 30 may determine that there is on external vehicle 200 in the driving lane of the subject vehicle 100.

There is an effect that it is possible to accurately determine whether there is an external vehicle 200 ahead of the subject vehicle 100 in the driving lane using not only driving information, which is received by the receiving unit 10, of an external vehicle 200 that is driven ahead of the subject vehicle 100 in the driving lane, but also sensing information of the sensor 20.

Driving information of an external vehicle that is driven in a first side lane, which has a speed limit higher than that of a driving lane, of side lanes may be received through the receiving unit 10, and the control unit 30 may control the speed of the subject vehicle 100 on the basis of the driving information of the external vehicle 200 that is driven in the first side lane.

When driving information received by the receiving unit 10 shows that there is no external vehicle 200 in the driving lane or when there is no external sensor 200 sensed by the sensor 20 in the driving lane, the control unit 30 controls the speed of the subject vehicle 100 on the basis of driving information of an external vehicle 200 adjacent to the subject vehicle 100.

In general, when it is a right-hand traffic road, the more the lanes go to the left, the higher the speed limit, and the more the lanes go to the right, the lower the speed limit. This rule is applied in Korea, USA, Germany, etc. Further, when it is a left-hand traffic road, road, the more the lanes go to the right, the higher the speed limit, and the more the lanes go to the left, the lower the speed limit.

In this embodiment, the control unit 30 receives driving information of an external vehicle 200 that is being driven in the first side lane of which the speed limit is higher than that of the driving lane, and controls the speed of the subject vehicle 100 on the basis of the speed of the external lane 200 that is being driven in the first side lane, whereby the subject vehicle 100 can be driven at a speed close to or the same as the speed of the external vehicle 200 that is being driven in the first side lane.

Accordingly, there is an effect that the subject vehicle 100 can be safely driven through platooning with external vehicles 200 that are driven in the first side lane.

The control unit 30 may control the speed of the subject vehicle 100 at the average speed of a plurality of vehicles 100 that is driven in the first side lane.

When a plurality of external vehicles 200 is being driven in the first side lane, in order for platooning with the plurality of external vehicles 200, when the receiving unit 10 receives driving information of the plurality of external vehicles 200 that is being driven in the first side lane, the control unit 30 may calculate an average value of the speeds of the external vehicles 200 and may control the speed of the subject vehicle 100 at the calculated average value.

Accordingly, there is an effect that the subject vehicle 100 can be safely driven through platooning with a plurality of external vehicles 200 that is being driven in the first side lane.

When the speed of the subject vehicle 100 is equal to or less than the average speed external vehicles 200 that are being driven in the first side lane, the control unit 30 may control the speed of the subject vehicle 100 on the basis of driving information of an external vehicle 200 that is being driven in a second side lane of which the speed limit is lower than the speed limit of the driving lane.

When the SCC speed set in the subject vehicle 100 is lower than the speed of an external vehicle that is being driven in the first side lane, driving information of a vehicle 100 that is being driven in the second side lane of which the speed limit is lower than the speed limit of the driving lane may be received and the speed of the subject vehicle 100 may be controlled on the basis of the received driving information of the external vehicle 200.

In this case, there is an effect the control unit 30 controls the subject vehicle 100 at a speed set to be equal to or higher than the speed of the external vehicle 200 in the second side lane, whereby the subject vehicle 100 can be stably driven in the driving lane of which the speed limit is higher than that of the second side lane.

The control unit 30 may control the speed of the subject vehicle 100 at the average speed of a plurality of vehicles 100 that is driven in the second side lane.

When a plurality of external vehicles 200 is being driven in the second side lane, in order for platooning with the plurality of external vehicles 200, when the receiving unit 10 receives driving information of the plurality of external vehicles 200 that is being driven in the second side lane, the control unit 30 may calculate an average value of the speeds of the external vehicles 200 and may control the speed of the subject vehicle 100 at a value obtained by adding a preset speed value to the calculated average value, whereby the speed of the subject vehicle 100 may be controlled so that the subject vehicle 100 is driven in the driving lane of which the speed limit is higher than that of the second side lane.

Accordingly, there is an effect that the subject vehicle 100 can be safely driven through platooning with a plurality of external vehicles 200 that is being driven in the second side lane.

The receiving unit 10 may set an external vehicle 200 within a predetermined distance from the subject vehicle 100 as an interest vehicle 100 and may receive driving information of the interest vehicle 100.

The receiving unit 10 may be set to receive only information of an external vehicle 200 within a predetermined distance from the subject vehicle 100 for V2X communication of the reception types of the receiving unit 10, and V2V communication can communicate with external vehicles 200 within a preset communication range.

Accordingly, there is an effect that it is possible to platoon with adjacent external vehicles 200 within a preset range from the subject vehicle 100.

The control unit 30 may control the speed of the subject vehicle 100 on the basis of driving information of common vehicles 100 of received driving information of external vehicles except for trucks 100 or emergency vehicles 100.

The control unit 30 may control the speed of the subject vehicle 100 on the basis of the driving information of a common vehicle 100 of the driving information of a plurality of external vehicles 200 received by the receiving unit 10 rather than driving information of trucks 100 of which the speed is considerably lower than that of the common vehicle 100 or emergency vehicles 100 of which the speed is considerably higher than that of the common vehicle 100.

Further, a vehicle that speeds over a preset speed range of common vehicles 100 may be excluded when an average value of the speeds of external vehicles 200 is calculated.

Accordingly, there is an effect that the control unit 30 controls the speed of the subject vehicle 100 on the basis of the average value of the speeds of external vehicles 200, whereby the subject vehicle 100 can be stably driven on a road through platooning with adjacent vehicles.

The control unit 30 of the vehicle control system may control the speed of the subject vehicle 100 lower than the speed limit of the driving lane by limiting the maximum speed of the subject vehicle 100 or the acceleration speed of the subject vehicle 100.

There is an effect that it is possible to control the subject vehicle 100 so that the subject vehicle 100 can be safely driven without speeding on a road through platooning at a speed close to the speeds of vehicles in adjacent lanes by limiting the operation range of an accelerator pedal or the acceleration speed to limit the maximum speed of the subject vehicle 100 when controlling the speed of the subject vehicle 100.

Figure 4:
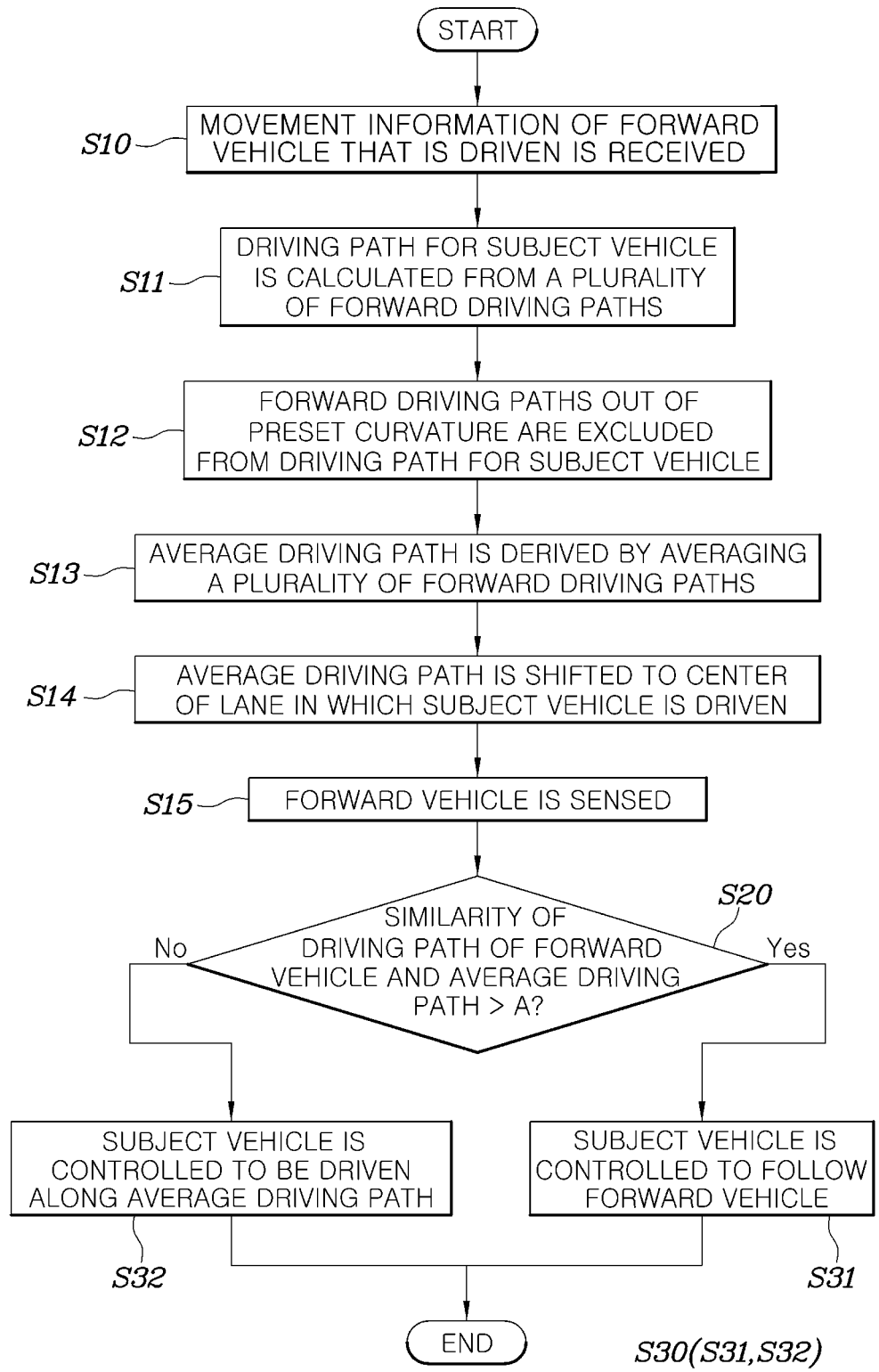
FIG. 4 is a flowchart of a vehicle control method according to an embodiment of the present invention.

FIG. 4 is a flowchart of the vehicle control method according to an embodiment of the present invention.

An exemplary embodiment of the vehicle control method according to the present invention is described with reference to FIG. 4.

The vehicle control method according to the present invention includes receiving movement information of a plurality of forward vehicles 220 on a road on which a subject vehicle 100 is driven through V2X communication (S10); sensing the forward vehicles 220 driven ahead of the subject vehicle 100; and a control unit 30 that calculates a driving path of the subject vehicle 100 on the basis of the movement information of the forward vehicles 220 received by the receiving unit 10 and controls driving of the subject vehicle 100 to follow the calculated driving path or the forward vehicles 220 sensed by the sensor 20*v*.

The receiving S10 may receive forward driving paths from the plurality of forward vehicles 220 and the controlling may include calculating a driving path for the subject vehicle 100 from a plurality of forward driving paths (S11).

The vehicle control method further includes deriving an average driving path by averaging the plurality of forward driving paths received in the receiving (S13) before the controlling S11, and the controlling may control the subject vehicle 100 to be driven along the average driving path considered as a driving path for the subject vehicle 100.

The controlling S30 may further include excluding forward driving paths, which do not have a preset curvature of the plurality of forward driving paths received in the receiving, from a driving path for the subject vehicle 100 (S12).

The controlling S30 further includes calculating a forward driving path on the basis of movement information of a forward vehicle 220 and shifting the forward driving path to the center of the lane of the subject vehicle 100 (S14). The controlling S30 may determine the shifted forward driving path as a driving path for the subject vehicle 100.

The sensing S15 further includes sensing the forward vehicle 220 in the driving lane and comparing the forward driving path of the forward vehicle 220 with the calculated driving path (S20). The controlling may include controlling the subject vehicle 100 to follow the forward vehicle when the similarity of the forward driving path of the forward vehicle 220 and the calculated driving path is high in the comparing (S31).

The controlling may include controlling the subject vehicle 100 to be driven along the calculated driving path when the similarity of the forward driving path of the forward vehicle 220 and the calculated driving path is low in the comparing of the forward driving path of the forward vehicle 220 with the calculated driving path (S32).

Figure 5:
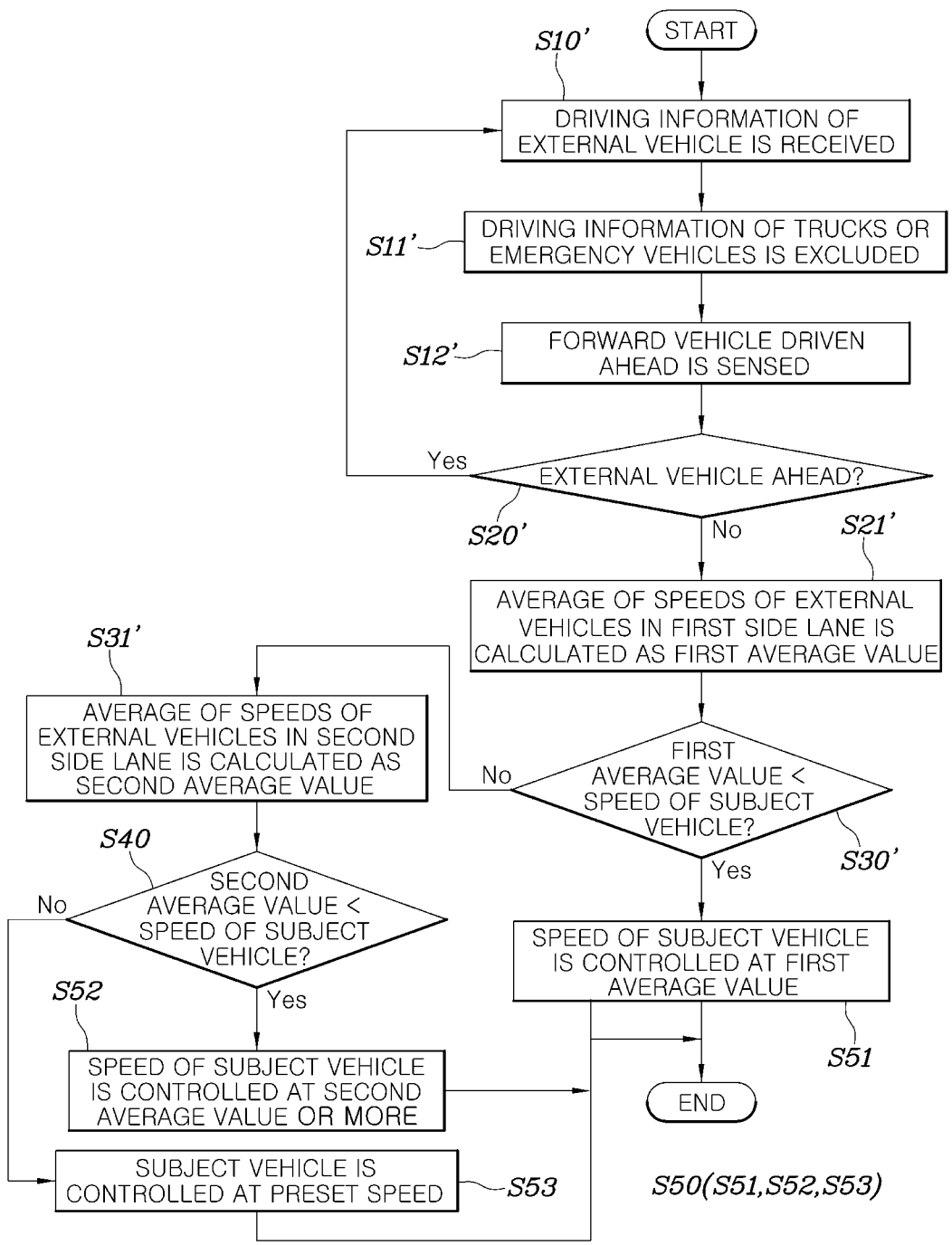
FIG. 5 is a flowchart of a vehicle control method according to another embodiment of the present invention.

FIG. 5 is a flowchart of a vehicle control method according to another embodiment of the present invention.

Another embodiment of the vehicle control method according to the present invention is described with reference to FIG. 5.

The vehicle control method according to the present invention includes: receiving driving information of an adjacent external vehicle 200 on a road on which the subject vehicle 100 is driven through V2X communication (S10'): and controlling a speed on the basis of the driving information of the external vehicle 200 when the speed of the external vehicle 200 received in the receiving S10' of the speed of the external vehicle 200 (S50).

In this case, the method further includes excluding information of trucks or emergency vehicles after the receiving 10' of driving information (S11'). Accordingly, it is possible to control the subject vehicle while excluding trucks or emergency vehicles from external vehicles 200.

The method further includes determining whether there is an external vehicle 200 ahead of the subject vehicle 100 in the driving lane on the basis of driving information of external vehicles 200 received in the receiving 10' (S20'). The controlling S50 may control the speed of the subject vehicle 10 on the basis of driving information of an external vehicle 200 that is being driven in a side lane.

The method further includes sensing an external vehicle 200 that is driven ahead of the subject vehicle 100 (S12'). The determining S20' may determine whether there is an external vehicle 200 ahead of the subject vehicle 100 in the driving lane on the basis of the sensing information obtained in the sensing.

The method further includes: calculating an average of the speeds of external vehicles 200 that are driven in a first side lane, of which the speed limit is higher than the speed limit of the driving lane received in the receiving 10', as a first average value on the basis of driving information of the external vehicles 200 that are driven in the first side lane (S21'); and comparing the first average value calculated in the calculating S21' of the first average value with the speed of the subject vehicle 100. The controlling S50 may include controlling the subject vehicle 100 to be driven at the calculated first average value when the speed of the subject vehicle 100 is higher than the first average value in the comparing of the first average value (S51).

The method further includes: calculating an average of the speeds of external vehicles 200 that are driven in a second side lane, of which the speed limit is lower than the speed limit of the driving lane received in the receiving 10', as a second average value on the basis of driving information of the external vehicles 200 that are driven in the second side lane (S31'); and comparing the second average value calculated in the calculating of the second average value with the speed of the subject vehicle 100 when the speed of the subject vehicle 100 is smaller than the first average value in the comparing (S40). Further, the method may include controlling the subject vehicle 100 to be driven at the second average value when the speed of the subject vehicle 100 is higher than the second average value in the comparing of the second average value S40 (S52).

The controlling S50 may further include controlling the speed of the subject vehicle 100 at a preset speed when the speed of the subject vehicle 100 is between the first average value and the second average value (S53).

The receiving S10' may set an external vehicle 200 within a predetermined distance from the subject vehicle 100 as an interest vehicle 100 and may receive driving information of the interest vehicle 100.

The method further includes excluding the driving information of trucks 100 or emergency vehicles 100 from the driving information of external vehicles 200 received in the receiving 10'. The controlling S50 may include controlling the speed of the subject vehicle 100 on the basis of driving information of a common vehicle 100.

The controlling may include controlling the speed of the subject vehicle by limiting the maximum speed of the subject vehicle 100 or limiting the acceleration speed of the subject vehicle 100 under the speed limit of the driving lane.

Although the present invention was provided above in relation to specific embodiments shown in the drawings, it is apparent to those skilled in the art that the present invention may be changed and modified in various ways without departing from the scope of the present invention, which is described in the following claims.

What is claimed is:

1. A vehicle control system comprising at least one processor, a memory, a sensor, and a wireless communication device that enables vehicle-to-everything (V2X) communication, the at least one processor being configured to execute instructions stored in the memory to:
   receive, through the V2X communication, movement information of a plurality of forward vehicles on a road on which a subject vehicle is driven;
   sense, through the sensor, a specific forward vehicle, from among the plurality of forward vehicles, that is driven ahead of the subject vehicle;
   calculate a driving path for the subject vehicle based on the movement information of the plurality of forward vehicles; and
   control driving of the subject vehicle to follow the driving path or the specific forward vehicle,
   wherein the at least one processor is configured to:
   receive forward driving paths from the plurality of forward vehicles, and calculate a forward driving path that is within a preset curvature, among the forward driving paths, as the driving path for the subject vehicle, and
   when a forward driving path that exceeds the preset curvature is received, derive an average driving path by averaging the other forward driving paths excluding the forward driving path that exceeds the preset curvature, and control the subject vehicle to drive along the average driving path,
   wherein the sensor is configured to sense a forward vehicle in a driving lane, and
   wherein the at least one processor is configured to control the subject vehicle to follow the calculated driving path for the forward vehicle when similarity of a forward driving path of the forward vehicle and the calculated driving path for the forward vehicle fails to meet a certain threshold.

2. The vehicle control system of claim 1, wherein the at least one processor is configured to calculate the driving path for the subject vehicle from the forward driving paths.

3. The vehicle control system of claim 1,
   wherein the at least one processor is configured to control the subject vehicle to follow the forward vehicle when similarity of the forward driving path of the forward vehicle and the calculated driving path for the forward vehicle meets the certain threshold.

4. The vehicle control system of claim 1, wherein the at least one processor is configured to:
   receive driving information of an adjacent external vehicle on the road on which the subject vehicle is driven through V2X communication, and
   control a speed of the subject vehicle based on the driving information of the external vehicle when the speed of the subject vehicle is equal to or higher than a speed of the external vehicle.

5. The vehicle control system of claim 4, wherein when it is determined that there is not an external vehicle ahead of the subject vehicle in a driving lane of the subject vehicle based on the driving information of external vehicles, the at least one processor is configured to control the speed of the subject vehicle based on driving information of an external vehicle that is being driven in a side lane.

6. The vehicle control system of claim 5, wherein the at least one processor is configured to:
   receive driving information of an external vehicle that is driven in a first side lane, of which a speed limit is higher than a speed limit of the driving lane, and control the speed of the subject vehicle based on the driving information of the external vehicle that is driven in the first side lane.

7. The vehicle control system of claim 6, wherein when the speed of the subject vehicle is equal to or lower than an average speed of the external vehicle that is being driven in the first side lane, the at least one processor is configured to control the speed of the subject vehicle based on driving information of an external vehicle that is being driven in a second side lane of which a speed limit is lower than the speed limit of the driving lane.

8. A vehicle control method in a vehicle control system comprising at least one processor, a memory, a sensor, and a wireless communication device that enables vehicle-to-everything (V2X) communication, the method comprising:
   receiving, by the V2X communication, movement information of a plurality of forward vehicles on a road on which a subject vehicle is driven;
   sensing, by the sensor, a specific forward vehicle, from among the plurality of forward vehicles, that is driven ahead of the subject vehicle;
   calculating, by the at least one processor, a driving path for the subject vehicle based on the movement information of the plurality of forward vehicles; and
   controlling, by the at least one processor, driving of the subject vehicle to follow the driving path or the specific forward vehicle,
   wherein the receiving of the movement information comprises receiving forward driving paths from the plurality of forward vehicles,
   wherein the calculating of the driving path comprises:
   calculating a forward driving path that is within a preset curvature, among the forward driving paths, as the driving path for the subject vehicle, and
   when a forward driving path that exceeds the preset curvature is received, deriving an average driving path by averaging the other forward driving paths excluding the forward driving path that exceeds the preset curvature; and
   controlling the subject vehicle to drive along the average driving path, and
   wherein the controlling of the driving of the subject vehicle further comprises:
   sensing, by the sensor, a forward vehicle in a driving lane,
   comparing, by the at least one processor, a forward driving path of the forward vehicle with the calculated driving path for the forward vehicle, and
   controlling, by the at least one processor, the subject vehicle to follow the calculated driving path for the forward vehicle when similarity of the forward driving path of the forward vehicle and the calculated driving path for the forward vehicle fails to meet a certain threshold.

9. The vehicle control method of claim 8, further comprising calculating the driving path for the subject vehicle from the forward driving paths.

10. The vehicle control method of claim 8, further comprising:
    controlling the subject vehicle to follow the forward vehicle when similarity of the forward driving path of the forward vehicle and the calculated driving path for the forward vehicle meets the certain threshold.

11. The vehicle control method of claim 8, further comprising:
    receiving driving information of an adjacent external vehicle on the road on which the subject vehicle is driven through V2X communication; and
    controlling a speed of the subject vehicle based on the driving information of the external vehicle when the speed of the subject vehicle is equal to or higher than a speed of the external vehicle.

12. The vehicle control method of claim 11, further comprising:
    determining whether there is an external vehicle ahead of the subject vehicle in a driving lane of the subject vehicle based on driving information of external vehicles; and
    controlling the speed of the subject vehicle based on driving information of an external vehicle that is being driven in a side lane.

13. The vehicle control method of claim 11, further comprising:
    calculating an average of speeds of external vehicles that are driven in a first side lane, of which a speed limit is higher than a speed limit of a driving lane, as a first average value based on driving information of external vehicles that are driven in the first side lane;
    comparing the first average value with the speed of the subject vehicle; and
    controlling the subject vehicle to be driven at the first average value when the speed of the subject vehicle is higher than the first average value.

14. The vehicle control method of claim 13, further comprising:
    calculating an average of speeds of external vehicles that are driven in a second side lane, of which a speed limit is lower than the speed limit of the driving lane, as a second average value based on the driving information of external vehicles that are driven in the second side lane;
    comparing the second average value with the speed of the subject vehicle when the speed of the subject vehicle is lower than the first average value; and
    controlling the subject vehicle to be driven at the second average value when the speed of the subject vehicle is higher than the second average value.

15. The vehicle control system of claim 1, wherein the at least one processor is further configured to:
    calculate a forward driving path based on movement information of one or more of the plurality of forward vehicles,
    shift the forward driving path to a center of a lane of the subject vehicle, and
    calculate the shifted forward driving path as the driving path for the subject vehicle.

16. The vehicle control method of claim 8, further comprising:
    calculating a forward driving path based on previously obtained movement information of one or more of the forward vehicles;
    shifting the forward driving path to a center of a lane of the subject vehicle; and
    calculating the shifted forward driving path as the driving path for the subject vehicle.

* * * * *